W. L. ROUNDS.
HYDRAULIC CLUTCH.
APPLICATION FILED MAR. 4, 1916.
1,224,669.
Patented May 1, 1917.
2 SHEETS—SHEET 1.
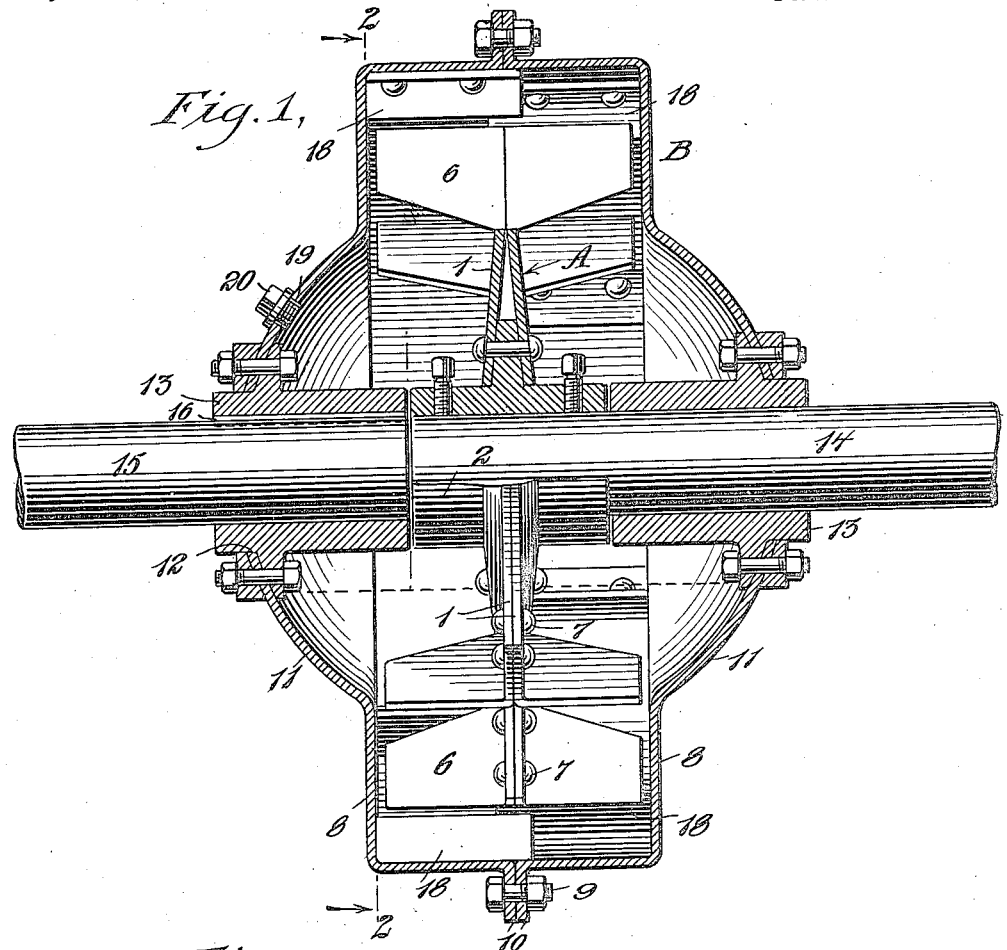
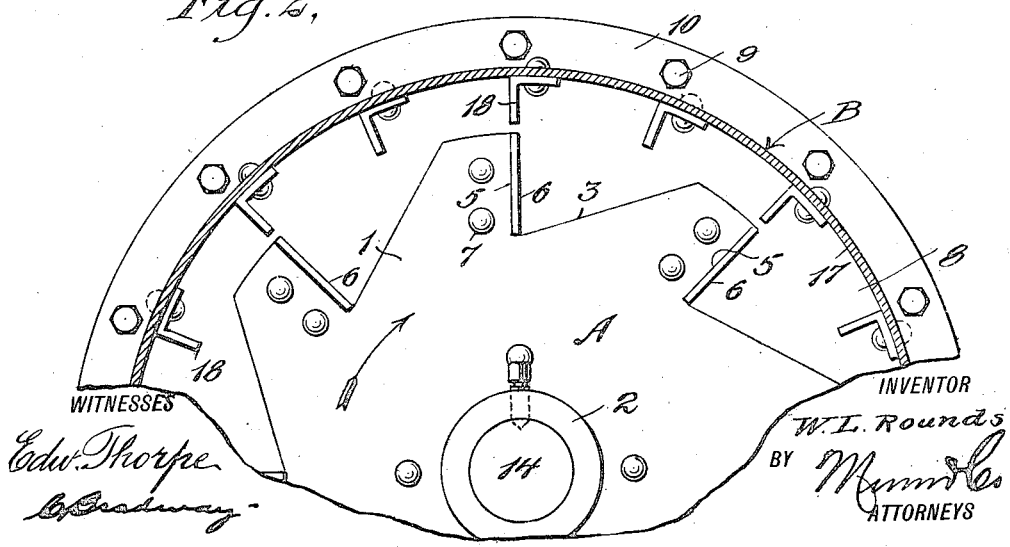
WITNESSES
Edw. Thorpe
INVENTOR
W. L. Rounds
BY
ATTORNEYS

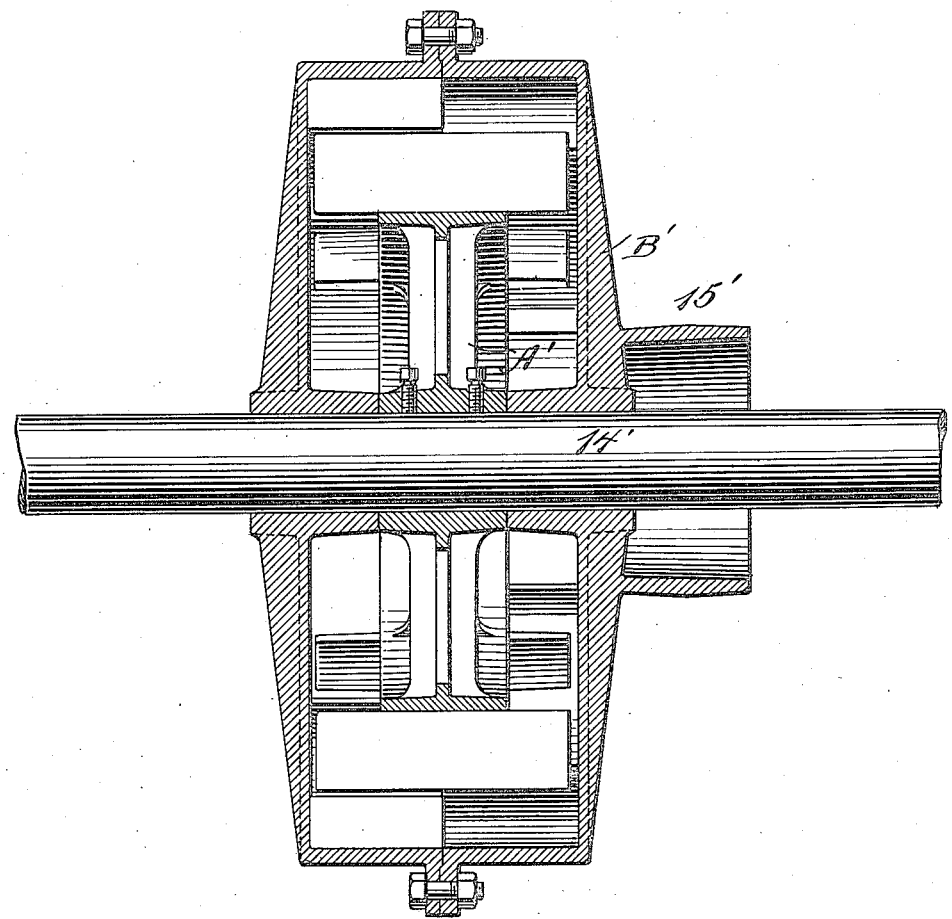

UNITED STATES PATENT OFFICE.

WILBUR LLOYD ROUNDS, OF RENSSELAER, NEW YORK.

HYDRAULIC CLUTCH.

1,224,669. Specification of Letters Patent. Patented May 1, 1917.

Application filed March 4, 1916. Serial No. 82,109.

*To all whom it may concern:*

Be it known that I, WILBUR L. ROUNDS, a citizen of the United States, and a resident of Rensselaer, in the county of Rensselaer and State of New York, have invented a new and Improved Hydraulic Clutch, of which the following is a full, clear, and exact description.

This invention relates to clutches, particularly of the hydraulic type, and is especially adapted to be used between driving and driven members where a simple, automatic and reliable clutching of the shafts is desired.

A more specific object of the invention is the provision of a clutch of that type including a liquid-tight casing connected with the driven element, and a rotary driver therein which acts through the hydraulic medium directly upon the casing or driven element for rotating the same, the clutch embodying a novel arrangement of vanes or blades disposed on the internal surface of the casing, in combination with a paddle-wheel or impeller which acts on the hydraulic medium in such a manner as to cause the casing to rotate, the construction being such that the load is taken up smoothly and gradually, as in starting the apparatus which is to be driven through the clutch by an electric motor, engine or other prime mover.

With such objects in view, and others which will appear as the description proceeds, the invention comprises various novel features of construction and arrangement of parts which will be set forth with particularity in the following description and claims appended hereto.

In the accompanying drawings, which illustrate certain embodiments of the invention and wherein similar characters of reference indicate corresponding parts in all the views, Figure 1 is a central vertical section of the clutch;

Fig. 2 is a section on the line 2—2, Fig. 1; and

Fig. 3 is a central section of a modified form of clutch.

Referring to the drawing, A designates the driving element of the clutch and B the driven element. The driving element is in the form of a paddle-wheel having a body formed of a pair of disks 1 fastened to a hub 2, and the periphery of the body of the wheel has notches or recesses 3 between adjacent ones of which are formed teeth or serrations 4, each being provided with a substantially radially leading edge 5. Extending from opposite sides of the edge 5 are wings 6 lying in a common plane which is radial with respect to the axis of rotation, and parallel with such axis. These wings are formed by bending out the stock from the disks 1 in forming the recesses 3, and in fact the recesses are a consequence of the bending out of the wings 6. The disks are fastened together by rivets 7. The casing B is largely made of sheet metal for the same reason that the impeller or wheel A is so made, that is, for lightness of weight. The casing is made of two similar sections 8 and 8 fastened together in any suitable manner, as, for instance by bolts 9 which pass through circumferential flanges 10. The side walls of the sections 8 have their central portions 11 dished so as to materially enlarge the cubical contents of the casing, and as a consequence the hydraulic medium in the casing will not be normally at such a high level, as would otherwise be the case. The dished portion 11 of each section has an opening 12 in which is inserted a cylindrical hub 13 bolted to the portion 11. The hub 13 of one section forms a bearing for the driving shaft 14 to which the wheel A is fastened, and the other hub 13 is connected with the driven shaft 15 by a key or equivalent means 16. On the internal surface of the cylindrical wall 17 of the casing are fastened vanes 18, there being a set of vanes on one section 8 and a set on the other section, and the vanes of the two sets overlap at their inner ends, and furthermore, the vanes are staggered so that the vanes of one set alternate with those of the other set. This staggering of the vanes on the driven element of the clutch prevents the lodgment of inert hydraulic medium at each vane, which would otherwise be the case if the vanes extended the full width of the casing. The hydraulic medium can be supplied to the casing through an opening 19 normally closed by a plug 20.

The modified form of clutch shown in Fig. 3 is similar in general structural features to the one already described, except that the wheel A' and casing B' are shown as castings, and the shaft 14' extends entirely through the casing, and the wheel A is fastened thereto while the casing B' has a pulley extension 15' by which power can be taken off the driven element or casing.

The drum or casing is partially filled with a heavy oil, grease or other semi-liquid medium, and in operation the paddle-wheel or impeller throws the hydraulic medium against the circumferential wall of the drum, where it acts against the vanes to cause the drums to revolve with the paddle-wheel or driving element. The hydraulic clutch is especially useful for driving cream separators from gasolene engines or the like, and in practice it proves to possess sufficient clutching power for relatively low speeds. The clutch can be also used for small electric lighting generators driven by gas engines and effectively reduces fluctuations in the current. In connection with an electric motor driving machinery a clutch as described is especially desirable, as the power of the clutch can be selected with respect to the load to be driven, whereby it will be impossible to overload the motor, since the clutch provides relative slippage between the driving and driven elements in such case.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A hydraulic clutch comprising driving and driven elements, one element being in the form of a liquid-tight casing having a cylindrical wall, and sets of vanes arranged on the internal surface of the said wall, the vanes of the sets being staggered with respect to each other, and the other element being in the form of an impeller wheel mounted in the casing and having blades for throwing the hydraulic medium outwardly against the vanes.

2. A hydraulic clutch comprising driving and driven elements, one element being in the form of a liquid tight casing having a circumferential wall, and internal vanes on the said wall, the vanes being arranged in sets in separate planes transverse to the axis of rotation, and one set of vanes being staggered with respect to the adjacent set, the inner ends of one set overlapping the inner ends of the other set, and the other element being rotatable in the casing and acting on the hydraulic medium therein for throwing the same outwardly against the vanes.

3. A hydraulic clutch comprising a casing rotatable on a horizontal axis and having vanes on its internal surface, a shaft connected with the casing to rotate therewith, a paddle wheel rotatably mounted in the casing, a shaft extending into the casing and rotatably connected with the wheel, the opposite sides of the casing being dished outwardly, and a hydraulic medium in the casing of such volume that its surface lies below the shafts when the casing and paddle wheel are idle.

4. A hydraulic clutch comprising a rotatable casing divided transversely to the axis of rotation into two sections, a set of vanes arranged around the circumference of each section and extending inwardly, said sections being fastened together, with the vanes of one section staggered with respect to those of the other, and a paddle wheel rotatably mounted in the casing and having circumferential blades disposed in radial planes.

In testimony whereof I have signed my name to this specification in the presence of two subscribing witnesses.

WILBUR LLOYD ROUNDS.

Witnesses:
    JOHN LUDDEN,
    GEO. C. VAN BUREN.